Nov. 28, 1939.  E. FRIEDLÄNDER ET AL  2,181,321

POWER REGULATION

Filed Sept. 3, 1938  3 Sheets-Sheet 1

WITNESSES:
C. J. Weller.
F. E. Hardy

INVENTORS
Erich Friedländer
and Oskar Schmutz.
BY
Ezra W. Savage
ATTORNEY

Nov. 28, 1939.  E. FRIEDLÄNDER ET AL  2,181,321

POWER REGULATION

Filed Sept. 3, 1938  3 Sheets-Sheet 2

WITNESSES:

INVENTORS
Erich Friedländer
and Oskar Schmutz.
BY
ATTORNEY

Patented Nov. 28, 1939

2,181,321

UNITED STATES PATENT OFFICE 2,181,321

POWER REGULATION

Erich Friedländer, Berlin-Siemensstadt, and Oskar Schmutz, Berlin-Haselhorst, Germany, assignors to Westinghouse Electric & Manufacturing Company, East Pittsburgh, Pa., a corporation of Pennsylvania Application September 3, 1938, Serial No. 228,336
In Germany August 19, 1937

10 Claims. (Cl. 171—119)

Our invention relates to power regulating equipment such as may be employed for controlling the power flow in alternating current circuits.

In order to govern the flow of power in alternating current electric circuits, it has been proposed to develop voltage components corresponding vectorially to the sum and to the difference of two voltages that are proportional, respectively, to the voltage and to the current of the circuit being regulated, and to compare the magnitudes of the vector sum and the vector difference of these two values after rectifying them separately to unidirectional quantities. If the vector representing the voltage of a circuit is very large in comparison with the vector representing current in that circuit, the difference of the voltage proportional vector and current proportional vectors becomes substantially proportional to the current times the power factor. This quantity is, however, proportional to the actual power flow only when the voltage of the circuit is constant. To measure the power of the circuit independently of the constancy of the voltage, it has been proposed to develop a vector in quadrature with the voltage vector by inserting reactors having saturated core structures in the conductors supplying the rectifiers. Thus the differences in the rectified voltages may be made proportional to the measured power. This, however, requires reactors which must be balanced in a special manner. Since, also, the two rectifier units are not equally loaded, rectified harmonics appear which give rise to undesirable disturbances.

This invention avoids these difficulties. In accordance with the invention, regulating apparatus is provided for effecting the summation of vector components including a phantom or local circuit into which is introduced a voltage vector that is a measure of the current flowing in the power circuit to be regulated, and a vector that is a measure of the voltage of the circuit being regulated. An auxiliary current component vector or voltage component vector is also introduced into the phantom circuit which, when added and subtracted vectorially together with the initial components of the circuit, establishes the basis for a measure of the desired value of power of the regulated circuit. The vector sum and vector difference of these vectors are supplied to a zero bridge circuit and separately rectified and the rectified components compared. Accordingly, the two rectified components become equal at some chosen value of power in the regulated circuit, resulting in a zero power output from the bridge circuit. If the power in the regulated circuit varies from this chosen value, a large differential current in the one or the other direction flows from the unidirectional output of the bridge circuit which may be used for regulating purposes.

The regulating apparatus that is energized from the phantom circuit and that supplies current to the zero power bridge circuit is thus employed as a device that depends for its operating characteristics upon the variation of the phase angle between the regulating current and voltage components impressed thereon. These components may be made up by adding the current proportional vector and an auxiliary current component vector and comparing the modified vector resulting from the two current components with the potential proportional vector, or the same result may be obtained by adding an auxiliary voltage component vector to the voltage proportional vector derived from the regulated circuit and comparing the modified vector so obtained with the current proportional vector desired from the regulated circuit. The vector introduced into the circuit of the apparatus that is derived from the voltage of the power circuit through mechanism which varies the magnitude of the current in such manner that it decreases for rising circuit voltage, so that the power formed from this current and the combined voltage is always substantially constant. This value corresponds to the desired value of the power in the regulated circuit. Also, equipment may be used in which the phase rotation in non-linear systems are employed, such, for example, as a choke coil with parallel impedance which may be excited by the current of one of the phase conductors of the power circuit, the voltage across this choke being inserted as an auxiliary potential in the potential path of the power regulator. It is advantageous to so connect these devices which supply auxiliary current or auxiliary voltage in the voltage circuit, or in the current circuit, respectively, that they are not influenced by the current or voltage transformers that supply the current or the voltage to the regulating apparatus.

Figure 1:
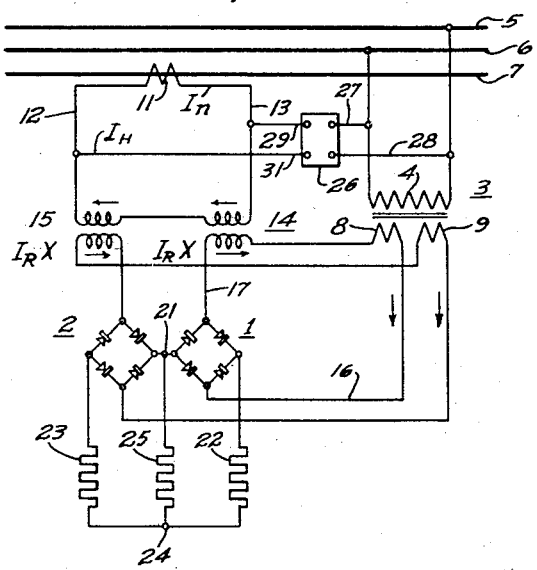
Figure 1 is a diagrammatic view of circuits and apparatus for developing a control potential in accordance with our invention.

Referring to Figure 1, the numerals 1 and 2 identify two full wave rectifier units, each unit comprising four rectifier elements connected in a well known manner. An alternating voltage that is the vector sum of the potential E and a current proportional vector $I_nX$ is supplied to one of the rectifier units. The other rectifier unit is supplied with an alternating voltage that is the vector difference of the vectors E and $I_nX$. A voltage transformer 3 is provided having a primary winding 4 connected to conductors 5 and 6 of the three-phase power circuit 5, 6 and 7 to be regulated, and having two secondary windings 8 and 9. A current transformer 11 is also provided, the primary winding of which is supplied with current from the three-phase conductor 7, and the secondary winding of which is connected through conductors 12 and 13 to the primary windings of choke coils or transformers 14 and 15. The secondary winding of the transformer 14 feeds the rectifier unit 1 through a circuit including the secondary winding 8 of the voltage transformer 3 and conductors 16 and 17. The secondary winding of the transformer 15 feeds the rectifier unit 2 in series with the secondary winding 9 of the voltage transformer 3.

Figure 2:
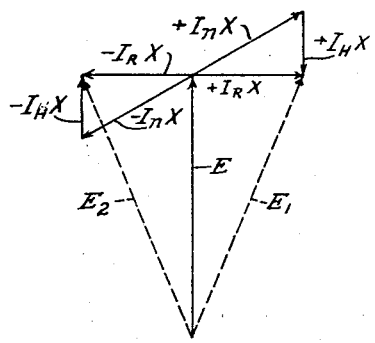
Fig. 2 is a vector diagram illustrating the vector quantities in the several parts of the circuits of Fig. 1.

In Fig. 2 the vector diagram of the voltage components developed in this phantom circuit is illustrated. The vector E is proportional to the power-circuit voltage and represents the voltages developed in the secondary windings 8 and 9 of the potential transformer 3. The quantity $I_nX$ is a vector that is proportional to the power circuit current and represents the voltage impressed across the primary windings of the choke coils or transformers 14 and 15 as a result of the current $I_n$ flowing from the secondary winding of the current transformer 11. The rectifier units 1 and 2 are connected together at the point 21 and impedance devices 22 and 23 are connected respectively in the output circuits therefrom, an impedance 25 being connected between the junction points 24 and 21 as illustrated.

When the output voltages of the rectifier units 1 and 2 are alike, the potential of the point 24 corresponds with that of the point 21, so that no current flows through the impedance 25. When the potential outputs from the rectifiers 1 and 2 are unequal, current will flow through the impedance 25 in the one or in the other direction depending upon which output voltage is larger and the value of the differential voltages. Since it is the real power that it is desired to regulate, and since the voltage on the choke coils 14 and 15 are displaced in phase with reference to the current by 90°, a potential E is selected as shown in Fig. 1 that is displaced by 90° in phase with reference to the current from the transformer 11. The introduction of the vector sum and vector difference of the initial voltage and current proportional vectors into the phantom circuit will therefore supply a differential current through the impedance 25 that is substantially proportional to the current in the regulated circuit times the power factor of the circuit if the potential is chosen sufficiently high.

According to the invention, the introduction of an auxiliary voltage component into the phantom circuit may be used to develop a current output that may serve as a standard of comparison of actual power to desired power in the regulated circuit. This current appearing in the impedance device 25 becomes zero when the regulated power becomes the desired value, and varies in polarity and magnitude as the power in the regulated circuit varies from the desired value in the one or in the other direction. For this purpose an auxiliary current may be derived, for example, from the potential E through a constant power device 26 which current, together with the potential E, develops a measure of the desired constant power.

The primary conductors 27 and 28 of the constant power device 26 are connected to the conductors supplying the voltage transformer 3, and the secondary conductors 29 and 31 from the device 26 are connected to also supply current to the primary windings of the choke coils or transformers 14 and 15. It will be seen, therefore, that the vector sum of the two currents is applied to the primary windings of the choke coils 14 and 15. One of these currents $I_n$ is derived from the current transformer 11 and is proportional to the power circuit current. The other of these two currents $I_H$ is derived from the constant power device 26 that is connected to the other two phase conductors from the current transformer 11.

The current supplied to the choke coils 14 and 15 may be purely wattless current for the desired value of power to be regulated. In this manner the simple zero power bridge connection becomes accurate even without the supply of quadrature current thereto and operates to develop a current that varies upon variation of the regulated power from the desired value.

Referring to Fig. 2, the auxiliary potential vector produced by the auxiliary current $I_H$ from the constant power device 26 is plotted and identified by $I_HX$. It is seen that for the proper magnitude of $I_H$ the difference in magnitude between the two vectors $E_1$ and $E_2$, shown in dotted lines, is equal to zero and the vector $I_RX$ is in quadrature to the potential vector E. If the potential vector E varies, then the current $I_H$ varies in such manner that the product E times $I_H$ remains constant. For variations in the power circuit voltage or the power circuit current, the angle between $I_RX$ and E varies from 90° and produces a difference in the vectors $E_1$ and $E_2$ for developing different output voltages from the rectifier units 1 and 2 and a differential current.

Figure 3:
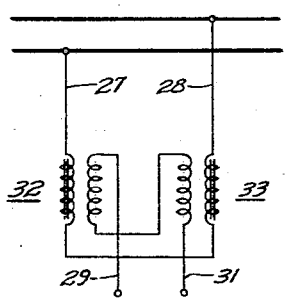
Fig. 3 is a diagrammatic view illustrating a constant power device that may be employed in Fig. 1.
Figure 4:
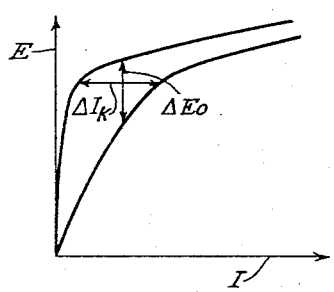
Figs. 4 and 5 are curves illustrating the operation of the equipment shown in Fig. 1.

A constant power device which satisfies the above mentioned requirements is illustrated in Fig. 3. It consists of two choke coils 32 and 33, one of which is saturated and the other unsaturated. The primary windings are connected in series through conductors 27 and 28 and energized in accordance with the voltage between power circuit conductors 5 and 6. The secondary windings are connected in series opposition to each other and to conductors 29 and 31. If the voltage across each choke coil is plotted as a function of the current therethrough as illustrated in Fig. 4, then a region exists between the two characteristic voltage current curves in which the difference in voltage $\Delta E_0$ for light current values is hyperbolically dependent on the current. In corresponding manner a similar hyperbolical characteristic line of the short circuit current $\Delta I_K$ with varying potential may be shown.

Figure 5:
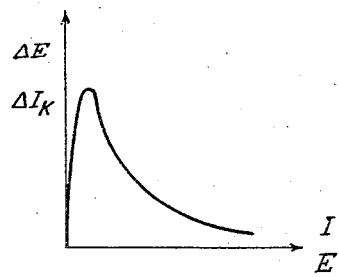

In Fig. 5 the curve illustrates the relationship existing between the differential current and voltage or the differential voltage and current. It will, therefore, be seen that with the proper displacement between these currents and potential values a constant power may be expressed by combining the difference current with the voltage or by combining the difference voltage with the current through the choke coils which appears nowhere as electrical power but which establishes a value that may be used as a unit for measuring a desired value of power.

Figure 6:
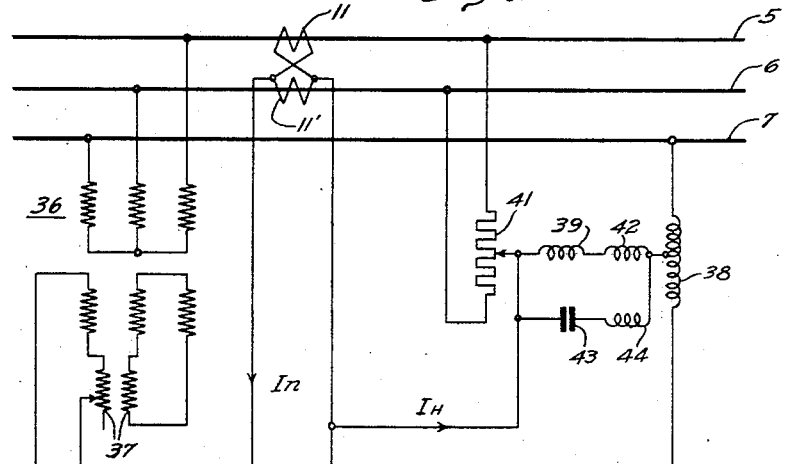
Fig. 6 is a diagrammatic view of circuits and apparatus employing another embodiment of the invention.

In Fig. 6 a constant power regulator is illustrated having a constant power device equivalent to that above described. To the extent that the parts correspond with those illustrated in Fig. 1 the same reference numerals are applied. The primary windings of the voltage transformers 34 and 35 are excited from one phase of the three-phase potential transformer 36, the circuit including an auxiliary transformer 37, the primary winding of which is connected to the other two phase windings of the transformer 36 to compensate for the loss in the phase angle occasioned by the choke coils 14 and 15. The primary winding of these choke coils are excited by two components of current, one of which, $I_n$, is the vector difference of two phase current which are derived from the current transformers 11 and 11'. The second or auxiliary current component is derived from a constant power device which consists of an unsaturated choke coil 38 and a saturated choke coil 39. These choke coils are connected in series between a potential divider 41 to the power circuit conductors 5 and 6, so that the current $I_H$ supplied therefrom has the proper phase relation to the potential vector E. The constant power device differs from the structure shown in Fig. 3 in that the choke coil 38 having an air gap is tapped and the saturated choke coil has no secondary winding.

An unsaturated choke coil 42 is connected in series with the saturated choke coil 39 for adjusting the slope of the saturating curve. In addition, a condenser 43 and a choke coil 44 are connected in parallel to the series circuit of the saturated choke coil 39 and the unsaturated choke coil 42 to suppress harmonics. By employing the circuits illustrated in Fig. 6, small power variations in the regulated current produces a larger usable differential current $\Delta I$ even when the power factor is poor. The two rectifiers are equally loaded at the desired value of power, so that inequalities which arise from harmonics are eliminated.

Figure 7:
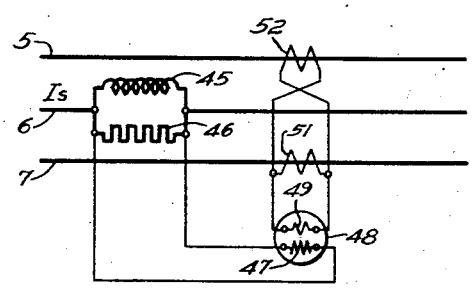
Fig. 7 is a diagrammatic view of circuits and apparatus illustrating the development of vector quantities for use as a power comparison unit in another embodiment of the invention.

While certain constant power devices have established only the phase position of the auxiliary current vector with reference to the voltage vector, it is also possible to develop the measure of a constant power by employing phase relations that occur in non-linear systems of saturated choke coils and impedances. The operation of such a constant power device may be explained by reference to Figs. 7 and 8. In Fig. 7 a saturated choke coil 45 is connected in parallel with an ohmic resistor 46 that is connected in series with the power circuit conductor 6. The vector sum of the currents in the elements 45 and 46 is equal to the phase current Is of the three-phase system and may be used for developing a quantity indicating constant power if it is brought into the proper relationship with a potential that is displaced by an angle $\theta$ with reference to the potential on the saturated choke coil 45 and proportional to it. The angle $\theta$ must be selected somewhat greater than the inclination angle of the characteristic curve of the choke coil 45 in the saturated range because the auxiliary voltage rises somewhat with the choke coil potential $E_D$.

Figure 8:
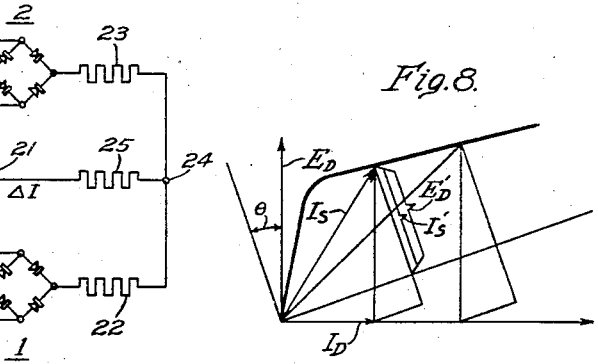
Figs. 8 and 9 are diagrammatic illustrations of curves and vector quantities explaining the operation of the mechanism as disclosed in Fig. 7.

In Fig. 8 the relationships are illustrated for two different values of current Is. The angle $\theta$ must be so selected that the product of the voltage and current components used which are in phase with the developed voltage are constant. Conversely, the voltages on the choke coil 45, when combined with a current displaced by an angle $-\theta$ with reference to the phase current Is, develops a quantity that is representative of a constant power.

If the potential at the choke coil 45 is imposed upon the potential coil 47 of a wattmeter 48, the current coil 49 of which is excited through two transformers 51 and 52, the wattmeter shows a constant power for variations in the current Is if the current through the current coils is so selected that it is displaced by an angle $-\theta$ with reference to the current Is and proportional to it. Conversely, also the phase current Is may be used and the choke coil 45 excited from two other currents in such manner that the desired current between Is and the choke potential is present.

Figure 9:
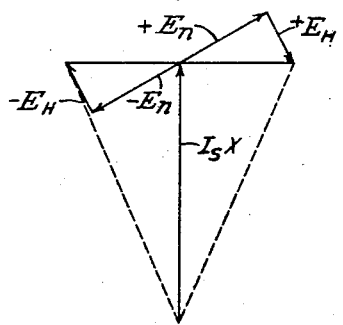

In Fig. 9 the vector diagram illustrates the component vectors from which the sum and difference voltage values (shown dotted) are developed. To the potential vector $I_sX$, potential vectors $E_n$ and $E_H$ are added and subtracted vectorially and the two resulting voltages separately applied to the two rectifier units so that for a predetermined real value of power in the regulated circuit the difference of potentials developed in the bridge is equal to zero.

Figure 10:
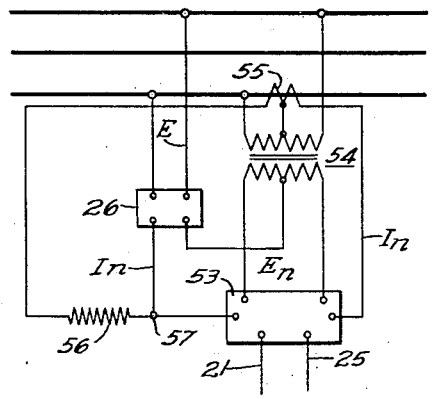
Figs. 10 and 11 illustrate apparatus that may be employed to neutralize undesirable effects of variable loading of the bridge circuit employed.

The current $I_H$ derived from the constant power device always operates with the variable power circuit current $I_n$ on the zero power bridge circuit of the two rectifier units. Consequently the constant power device is not uniformly loaded. To neutralize harmful reactions of variable loading, it is preferable to supply to the constant power device a power circuit current component in the opposite sense. An embodiment of apparatus for doing this is shown in Fig. 10. The device 53 in Fig. 10 is the regulating apparatus for supplying the zero power bridge and which may correspond, for example, to the apparatus enclosed within the dotted line 53 in Fig. 6. The regulating apparatus is supplied with a voltage component from the potential transformer 54 that corresponds to the voltage of the power circuit. A vector component corresponding to current $I_n$ is also supplied to the apparatus from the current transformer 55. The current transformer is illustrated as tapped at the center, and its two outer terminals are connected through the regulating apparatus 53 and through an impedance device 56 that are connected in series. The impedance 56 is so dimensioned as to correspond to the impedance of apparatus 53 through which the current from the transformer 55 flows. The constant power device 26 is connected between the center point of the secondary winding of the transformer 54 and a point 57 between the impedance 56 and the regulating apparatus 53. Consequently, the loading of the constant power device 26 is independent of the magnitude of the current supplied by the transformer 55. In the arrangement illustrated in Fig. 10 the quantity used as a standard of comparison for the regulated power was derived from the potential and introduced into the current transformer circuit, while in the arrangement illustrated in Fig. 11 the comparison power component is derived from the current transformer and introduced into the potential transformer circuit. The constant power device is again identified by the numeral 26 and is excited from the current transformer 58 which also supplies the component $I_n$ to the regulating apparatus 53.

The potential transformer 59 is provided with a secondary winding which feeds the series circuit including the impedance 61 and the apparatus 53. The impedance 61 is so dimensioned that it is equal to the impedance of the regulating apparatus 53 in the potential circuit, and therefore equal to the impedance which opposes the flow of current through the potential transformers in the apparatus 53. The constant power device 26 that supplies the auxiliary potential is connected between the center point 62 of the potential transformer 59 and the point 63 between the apparatus 53 and the equivalent impedance 61, so that it is not influenced by the power circuit potential.

Figure 12:
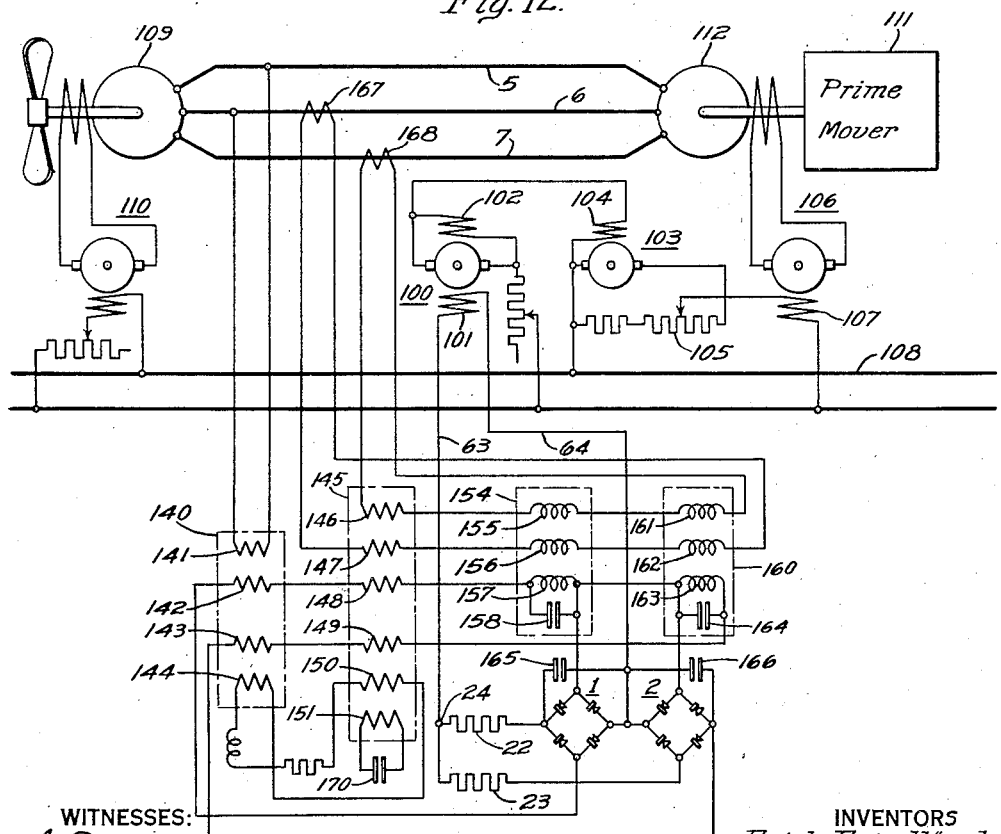
Fig. 12 is a diagrammatic view of apparatus and circuits illustrating a complete power regulating system organized in accordance with the invention.

In Fig. 12 a complete power regulating system for maintaining the power output of a generator is illustrated. The power regulating equipment is shown in the portion of the diagram enclosed within dash lines. In the figure a propeller driving motor 109 is illustrated that is excited by a generator 110, the field winding of which is supplied with current from a constant direct current source such as conductors 108. The motor 109 is supplied with energy through three phase circuit conductors 5, 6 and 7 from an alternating current generator 112 that is driven by a prime mover, such as a Diesel engine 111. The generator 112 may be excited from a generator 106, having a field winding 107 that is energized in part from the constant potential source 108, and in part from a generator 103. The generator 103 is connected in parallel with a resistor 105 and provided with a field winding 104 that is connected to be energized in part from the constant potential source 108 and in part from the pilot generator 100. The pilot generator 100 is provided with a shunt field winding 102 and a field winding 101 that is connected by conductors 63 and 64 to junction points 24 and 21, respectively, corresponding to the impedance device 25 in the circuit in Figs. 1 and 6.

Two full-wave rectifier units 1 and 2 supply unidirectional current to the impedance devices 22 and 23 in the same manner as explained with relation to Figs. 1 and 6. A potential transformer 140 is provided, the primary winding 141 of which is connected to the power circuit conductors 5 and 6. The potential transformer 140 is provided with three secondary windings 142, 143 and 144. The device 145 is a saturated choke coil having two primary windings 146 and 147 and the several secondary windings 148, 149, 150 and 151. The device 154 is an unsaturated choke coil having an air gap and provided with primary windings 155 and 156 and with a secondary winding 157. A second non-saturating choke coil 160 is provided having an air gap and provided with primary windings 161 and 162 and with a secondary winding 163.

The saturated choke coil is excited from two current transformers 167 and 168 that are connected respectively in phase circuit conductors 6 and 7. As illustrated, the unsaturated coils 154 and 160 are also energized from the same current transformers. The number of turns are so selected that the potential impressed on the secondary windings 148 and 149 of the saturated choke coil 145 are at an angle with respect to the voltages impressed on the choke coils 154 or 160 and proportional to the current, and having a magnitude such that the indicated power resulting from combining these two vectors is constant when the current flowing through the current transformers 167 and 168 varies and that for the desired value of power the two potentials acting on the rectifier are equal. The proper angular relationship between the vector values to be selected appears by reference to Fig. 8 and the description relating thereto. The rectifier unit 1 is supplied with the sum of the voltages developed in the windings 142, 148 and 157 ($E_n + E_H + I_sX$). The rectifier unit 2 is supplied with the sum of the potentials developed in windings 143, 149 and the counter potential of the winding 163 ($E_n + E_H - I_sX$).

This corresponds substantially to the values represented vectorially in Fig. 9 with the difference that for the formation of the potential affecting the second rectifier unit $E_n + E_H - I_sX$ represents a vector in which the last of the three named vector components is in a reverse direction from that shown in Fig. 9. The resultant sum of the three voltage components, however, corresponds in magnitude to the potential $$-E_n - E_H + I_sX$$

and is displaced in phase relation therefrom by 180°.

Condensers 158 and 164 are connected in parallel to windings 157 and 163, respectively, to reduce harmonics. The condensers 165 and 166 connected across the rectifier units 1 and 2 aid in smoothing out ripples in the unidirectional current.

Figure 11:
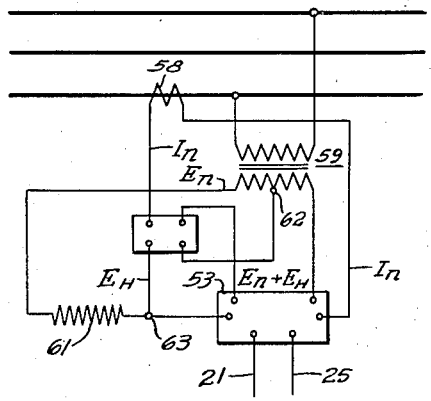

To avoid back action of the potential transformer 140 on the saturated choke coil 145, the windings 144 and 150 are connected opposite to each other and in this manner the choke coil 152 and the resistor 153 which corresponds to the impedance that opposes the flow of current to the transformer 140 are connected in the circuit. Only the imposed potential and the absorbed current of the transformer need therefore be measured. Accordingly the same arrangement as illustrated in Fig. 11 is employed. To relieve the saturated choke coil 145 from too high wattless currents which arise from the fact that the choke coils 154 and 160 are present, a condenser 170 is connected in parallel to the secondary winding 151. The ohmic resistor shown as 46 in Fig. 7 is here absent, it being replaced by the loading produced by the rectifier with its impedance and the choke coils 154 and 160 because it is apparent that for an arrangement according to Fig. 7 the impedance 46 need not be a purely ohmic resistance.

The differential current acting on the field winding 101 of the pilot exciter 100 varies the voltage output of that machine to control the voltage output of machines 103 and 106 and, therefore, of the generator 112 in a well known manner. Thus the power delivered by the generator 112 is regulated by controlling its excitation. As the output of the generator varies from the chosen value a positive or a negative unidirectional current is supplied in the one or the other direction through the field winding 101 to limit or to correct for variations in the power through a circuit 5, 6 and 7 from a desired value.

Modifications in the apparatus and circuits illustrated will be apparent to those skilled in the art within the scope of the invention and I do not wish to be limited otherwise than by the scope of the appended claims.

We claim as our invention:

1. In a regulating system for governing the power flow in a regulated alternating current circuit, a phantom circuit including a circuit part in which a component is developed that corresponds to the current of the regulated circuit, a circuit part in which a component is developed that corresponds to the voltage of the regulated circuit, a constant power device for developing an auxiliary voltage component of such value and phase relation that when combined with one of said first two named components develops a modified component that is in quadrature with the other of said first two named components for a chosen power flow through the regulated circuit, an impedance network including induction apparatus for developing the vector sum and the vector difference of said current and voltage components, rectifier means for developing a resultant unidirectional voltage that corresponds to the difference in magnitude of the vector sum and the vector difference components, and means controlled by said unidirectional voltage for regulating the power in said regulated circuit.

2. In a regulating system for governing the power flow in a regulated alternating current circuit, a phantom circuit including a circuit part in which a voltage component is developed that corresponds to the current of the regulated circuit, a circuit part in which a voltage component is developed that corresponds to the voltage of the regulated circuit, means for developing an auxiliary voltage component of such value and phase relation that when combined with one of said first two named components develops a modified component that is in quadrature with the other of said first two named components for a chosen power flow through the regulated circuit, means for developing the vector sum and the vector difference of said current and voltage components, means for separately rectifying the vector sum and the vector difference of said current and voltage vectors, and means controlled by the difference in magnitude and polarity of the rectified voltages for controlling the power in said regulated circuit.

3. In a regulating system for governing the power flow in a regulated alternating current circuit, means including a transformer for developing a voltage component that is proportional to the current of the regulated circuit and transformer means for developing a voltage component proportional to the voltage of the regulated circuit means including induction apparatus for developing two voltages corresponding, respectively, to the vector sum and the vector difference of the current and voltage proportional components, means for developing an auxiliary voltage component of such value and phase relation with respect to one of said first two components that the modified component which results is a measure of the desired power to be regulated.

4. In a regulating system for governing the power flow in an alternating current circuit, a circuit network including means for developing a voltage component proportional to the current of the regulated circuit, and a voltage component proportional to the voltage of the regulated circuit, and means for combining said two components for developing two voltages corresponding, respectively, to the vector sum and the vector difference of the current and voltage proportional components, and means for developing an auxiliary voltage component of such value and phase relation with respect to one of said first two components that the modified component which results is a measure of the desired power to be regulated, said means comprising a constant power device for developing an auxiliary component having the characteristic that the power formed by the supplied voltage and the delivered current is substantially constant for varying supplied voltages.

5. In a regulating system for governing the power flow in an alternating current circuit, a circuit network including means for developing a voltage component that is proportional to the current of the regulated circuit and means for developing a voltage component that is proportional to the voltage of the regulated circuit, and two circuits including inductive apparatus for combining said two components for developing two voltages corresponding, respectively, to the vector sum and the vector difference of the current and voltage proportional components, and means for developing an auxiliary current component comprising a constant power device connected to be energized in accordance with the power circuit voltage for so varying the current delivered therefrom that the power formed by the auxiliary current component and the voltage component is constant.

6. In a regulating system for governing the power flow in an alternating current circuit, a circuit network including means for developing a voltage component that is proportional to the current of the regulated circuit and a voltage component that is proportional to the voltage of the regulated circuit, and means for combining said two components for developing two voltages corresponding, respectively, to the vector sum and the vector difference of the current and voltage proportional components, and means for developing an auxiliary voltage component comprising a device connected to be energized in accordance with the power circuit current at such a phase angle that the power formed by the auxiliary voltage component and the current component is a constant.

7. In a regulating system for governing the power flow in an alternating current circuit, a circuit network including means for developing a voltage component that is proportional to the current of the regulated circuit and a voltage component that is proportional to the voltage of the regulated circuit, and means for combining said two components for developing two voltages corresponding, respectively, to the vector sum and the vector difference of the current and voltage proportional components, and means for developing an auxiliary current component comprising a constant power device connected to be energized in accordance with the power circuit voltage for so varying the current delivered therefrom that the power formed by the auxiliary current component and the voltage component is constant, said constant power device comprising two transformers having their primary windings connected in series and energized in accordance with the power circuit voltage and their secondary windings connected in opposition, one of said transformers having a saturated core and the other an unsaturated core.

8. In a regulating system for governing the power flow in a regulated alternating current circuit, a circuit network including means for developing a voltage component proportional to the current of the regulated circuit and a voltage component proportional to the voltage of the regulated circuit, and means for combining said two components for developing two voltages corresponding, respectively, to the vector sum and the vector difference of the current and voltage proportional components, and means for developing an auxiliary voltage component comprising a device connected to be energized in accordance with the power circuit current at such a phase angle that the power formed by the auxiliary voltage component and the current component is a constant, said device including a saturated choke coil in series with a power circuit conductor and an impedance in parallel therewith.

9. In a regulating system for governing the power flow in a regulated alternating current circuit, regulating apparatus for developing voltages corresponding, respectively, to the vector sum and to the vector difference of current and voltage components derived from the regulated circuit, a local circuit for supplying said regulator having a circuit part including a current transformer for supplying a current component to the regulator that is a measure of the current in the regulated circuit, a circuit part including a voltage transformer for supplying a voltage component to the regulating apparatus that is a measure of the voltage of the regulated circuit, and a circuit part including a device for developing an auxiliary vector of such magnitude and phase relation with respect to the current dependent vector or the voltage dependent vector as to give a power corresponding substantially to the desired value of the power to be regulated, characterized by the fact that the transformer supplying the current for the regulator is tapped at the center and that the two ends of the current transformer winding are connected to supply a circuit including in series the regulator and an impedance device having an impedance corresponding to the impedance of the regulator, and that the device for developing the auxiliary vector component is connected between the impedance device and the regulator.

10. In a regulating system for governing the power flow in a regulated alternating current circuit, regulating apparatus for developing voltages corresponding, respectively, to the vector sum and to the vector difference of current and voltage components derived from the regulated circuit, a local circuit for supplying said regulator having a circuit part including a current transformer for supplying a current component to the regulating apparatus that is a measure of the current in the regulated circuit, a circuit part including a voltage transformer for supplying a voltage component to the regulating apparatus that is a measure of the voltage of the regulated circuit, and a circuit part including a device for developing an auxiliary vector of such magnitude and phase relation with respect to the current dependent vector or the voltage dependent vector as to give a power corresponding substantially to the desired value of the power to be regulated, characterized by the fact that the voltage transformer supplying the voltage to the regulating apparatus is tapped at the center and the two ends are connected to a circuit including the regulating apparatus and an impedance device connected in series, said impedance device having an impedance equal to the impedance of the regulator, and that the device which supplies the auxiliary component to the apparatus is connected between the center point of the voltage transformer and a junction point between the impedance device and the regulating apparatus.

ERICH FRIEDLÄNDER.
OSKAR SCHMUTZ.